(12) United States Patent
Chuang et al.

(10) Patent No.: US 9,236,593 B2
(45) Date of Patent: *Jan. 12, 2016

(54) BATTERY ASSEMBLY WITH ADHESIVE STOP MECHANISM

(71) Applicant: Atieva, Inc., Redwood City, CA (US)

(72) Inventors: Chia-Ming Chuang, Taipei (TW); Tai-Tsun Liu, Taipei (TW)

(73) Assignee: Atieva, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,519

(22) Filed: May 12, 2015

(65) Prior Publication Data

US 2015/0243948 A1 Aug. 27, 2015

Related U.S. Application Data

(63) Continuation of application No. 13/896,155, filed on May 16, 2013, now Pat. No. 9,040,185.

(30) Foreign Application Priority Data

Sep. 6, 2012 (CN) .......................... 2012 1 0326085

(51) Int. Cl.
  *H01M 2/10* (2006.01)
  *H01M 10/625* (2014.01)
  *H01M 10/6551* (2014.01)

(52) U.S. Cl.
  CPC .......... *H01M 2/1077* (2013.01); *H01M 2/1083* (2013.01); *H01M 10/625* (2015.04); *H01M 10/6551* (2015.04); *H01M 2220/20* (2013.01)

(58) Field of Classification Search
  None
  See application file for complete search history.

(56) References Cited

U.S. PATENT DOCUMENTS

| 5,200,687 | A | * | 4/1993 | Lindblom et al. | 320/112 |
| 8,389,142 | B2 | | 3/2013 | Kreiner et al. | |
| 8,426,063 | B2 | | 4/2013 | Lin | |
| 2010/0119929 | A1 | * | 5/2010 | Gaben et al. | 429/120 |
| 2013/0071705 | A1 | | 3/2013 | Frutschy et al. | |

FOREIGN PATENT DOCUMENTS

| JP | 5108169 | 10/2012 |
| KR | 10-2011-0062988 | 6/2011 |

OTHER PUBLICATIONS

International Search Report, PCT/US2014/038271, mailed Sep. 15, 2014.

* cited by examiner

*Primary Examiner* — Patrick Ryan
*Assistant Examiner* — Wyatt McConnell
(74) *Attorney, Agent, or Firm* — Womble Carlyle Sandridge & Rice LLP (57) ABSTRACT

A battery assembly provided with an adhesive stop mechanism is disclosed. The battery assembly includes multiple battery cells, a primary retaining frame, a secondary retaining frame, two common electrodes and a bonding layer. The primary and second retaining frames are combined together to constitute accommodation chambers for housing the battery cells. The primary retaining frame includes an outer deck and a shallow deck, wherein the outer deck is formed with adhesive application pores and the shallow deck is formed with stop portions corresponding to the adhesive application pores. The adhesive composition applied through the adhesive application pores is confined by the stop portions and subsequently cured into a bonding layer that firmly holds the battery cells within the accommodation chambers.

14 Claims, 8 Drawing Sheets

BATTERY ASSEMBLY WITH ADHESIVE STOP MECHANISM

FIELD OF THE INVENTION

The present invention relates to a battery assembly with multiple battery cells and, more particular, to a battery assembly whose frames are provided with an adhesive stop mechanism.

BACKGROUND OF THE INVENTION

Given the risk of increasing carbon emissions when using a pollution-generating energy source with limited reserves, such as fossil oil and natural gas, high-tech industries are pursuing replacement of the traditional energy sources with renewable and clean energy sources, including solar energy, hydraulic energy and wind energy. With this trend, vehicles with electric propulsion are being deployed in place of conventional internal combustion cars. The development of electric-powered vehicles has thus attracted great interest in the related fields.

An electric-powered vehicle requires a large quantity of power for long-distance running and, therefore, must be equipped with a good number of battery cells in its energy source. For a compact car with a 100-kilometer driving range, a 30 kWh battery pack is needed. It would require 3,000 of 18650 format battery cells arranged in parallel and in series in a battery pack to provide the required current and voltage levels to power the vehicle. Design a battery assembly that can meet safety, performance and operating life are critical to the success of an electrical vehicle. Prevention of vehicle fires due to battery thermal runaway is an important safety feature. It is unavoidable to have some cells exhibit thermal runaway due to manufacturing defects, assembly defects, or external impact event, but it is not acceptable for the small number of cells under thermal runaway to propagate into full pack fires.

A solution to the problem was proposed by some manufacturers, where the respective battery cells were coated by fire-proof material to prevent the battery cells from being ignited by adjacent cells under thermal runaway. During discharging or charging operations, a battery cell will generate heat, causing a temperature rise in the battery cells. Given the common battery configuration where positive and negative electrodes are at opposite ends, most heat dissipation is through the lateral side of the battery cell. In the case where the battery cell is covered at its lateral side with refractory material, the heat transfer is impeded and the battery cell ran hotter. Hotter battery cell lowers operating life. For every 10 degrees Celsius rise, the operating life is halved. Furthermore, battery cell with diminished heat dissipation capacity has an increased risk of thermal runaway, because battery self-heating could gradually build up to higher temperatures, causing electrolyte to decompose, surface electrolyte interface to degenerate, and various other chemical reactions to accelerate until the temperature rises to several hundred degrees Celsius and the cell ruptures and vents with very high temperature gas, over 1,000 degrees Celsius that could ignite adjacent materials.

A conventional method for fastening battery cells involves placing the battery cells into an accommodation space defined by a housing and then filling up the accommodation space with adhesive glue, whereby the battery cells are fastened within the accommodation space when the adhesive glue is cured. However, this method consumes a great amount of adhesive glue and increases the manufacture cost. Meanwhile, since the battery cells are generally covered by adhesive glue, the heat dissipation from the battery cells is largely reduced, thus causing a rise in operating temperature that leads to lower useable life. An adhesive stop mechanism allows a fixed amount of glue be placed on each cell, therefore the quality of bonding is assured with no waste in glues. Furthermore, by judicious design of the depth of said adhesive stop, the adhesive bonding area of the cell can be varied. For regions where the vibration is expected to be worse, more bonding area can be allocated, for regions where the vibration is expected to be less, for example with close proximity to fastening systems, the bonding area can be lessened.

In addition, the adhesive bonding area of the cell has lower thermal conductivity, and judicious design of the depth of said adhesive stop changes the heat dissipation capability of the battery cell. In an air cooled battery module, cells near the air inlet can be made to have worse heat dissipation, where the air is cooler. Cells near the air outlet can be made to have better heat dissipation, where the air is hotter. Since the life of the battery module is determined by the highest cell temperature, current invention effectively even out the temperature differences within the module, lowers the highest temperature of the cell group, with the desired effect of increasing battery module life.

In an electric vehicle battery assembly, no matter whether the battery cells provided therein are connected in parallel or in series, the positive and negative electrodes of the battery assembly are usually connected to the same side of the system through electric wires, so as to facilitate the installation and maintenance works. However, extra electrical wiring means extra burden to keep them organized in the compact space of the battery pack. The management of the complicated electric wires during the replacement, repair and maintenance of battery assemblies is a burdensome and safety hazardous task for installation and maintenance personnel.

Therefore, there is a need for a reliable adhesive-bonded battery assembly architecture, in which battery cells are mounted in a stable and robust manner to withstand vibration and have improved heat dissipation capability and prolonged endurance, and in which a highly effective thermal conductive device is mounted to lower the risk of cell thermal runaway, thereby safeguarding the safety of personnel and property. Advantageously, the battery assembly can be easily installed and maintained to save the manpower and time.

SUMMARY OF THE INVENTION

An aspect of the invention is to provide a battery assembly having an adhesive stop mechanism, in which battery cells are mounted in a robust manner to prevent them from accidental disconnection or even falling off due to vehicle vibration.

Another aspect of the invention is to provide a battery assembly with varying level of cell adhesive bonding areas, thereby increasing module shock and vibration resistance and optimizing glue usage at the same time.

Another aspect of the invention is to provide a battery assembly having an adhesive stop mechanism to reduce the amount of adhesives needed for securing battery cells in position, thereby decreasing the overall manufacture cost.

A still another aspect of the invention is to provide a battery assembly with improved heat dissipation capability, thereby prolonging the service life of the battery cells.

A still another aspect of the invention is to provide a battery assembly with leveling temperature differences within a battery assembly, thereby prolonging the service life of the battery module.

A yet still another aspect of the invention is to provide a battery assembly having an adhesive stop mechanism, whose architecture is advantageous in facilitating the replacement of failed battery cells, thereby reducing the time needed for the replacement.

Therefore, the invention provides a battery assembly having an adhesive stop mechanism. The battery assembly comprises a plurality of battery cells, each comprising a top end electrode and bottom end electrode; a primary retaining frame comprising an outer deck and a shallow deck, wherein the outer deck is formed with a plurality of retaining holes and a plurality of adhesive application pores, and wherein the shallow deck is formed with a plurality of through holes, each corresponding to one of the retaining holes, and a plurality of stop portions, each corresponding to one of the adhesive application pores; a secondary retaining frame formed with a plurality of accommodation holes, each corresponding to one of the retaining holes, the respective retaining holes being registered with the respective accommodation holes corresponding thereto to constitute a plurality of accommodation chambers for housing the battery cells; a top common electrode and a bottom common electrode electrically connected to the top end electrodes and the bottom end electrodes of the battery cells, respectively; and a bonding layer adhesively attached to the battery cells and to the stop portions formed on the shallow deck, so as to constitute a heat dissipation ventilation portion between the shallow deck and the secondary retaining frame.

In the battery assembly disclosed herein, the battery cells are housed by the accommodation chambers, and adhesive composition is then added into the assembly through the adhesive application pores. During the adhesive application process, the adhesive composition is confined between the outer layer and the shallow layer by the stop portions and subsequently cured into a bonding layer that firmly holds the battery cells within the accommodation chambers. By virtue of the adhesive stop mechanism, only a small amount of the adhesive composition is needed to secure the battery cells in position. Meanwhile, since the bonding layer is only adhesively attached to the end portions of the battery cells, the respective battery cells are exposed to the heat dissipation ventilation portion to the greatest extent and have a large surface area in contact with air. The overall heat dissipation efficiency is therefore enhanced considerably. In addition, a heat dissipation device may be mounted at both ends of the battery cells, so as to facilitate heat dissipation from the battery cells via both ends thereof.

By virtue of the arrangement disclosed herein, the battery cells will not easily fall off from the assembly even under severe vibration, thereby preventing the occurrence of accidental disconnection or short circuit and increasing safety during operation. During maintenance, the technicians can simply replace the battery assemblies which contain damaged or low-power battery cells with functional battery assemblies. The overall replacement efficiency is improved and the manpower needed for maintenance works is thus reduced considerably. The invention achieves the objects described above accordingly.

BRIEF DESCRIPTION OF THE DRAWINGS

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
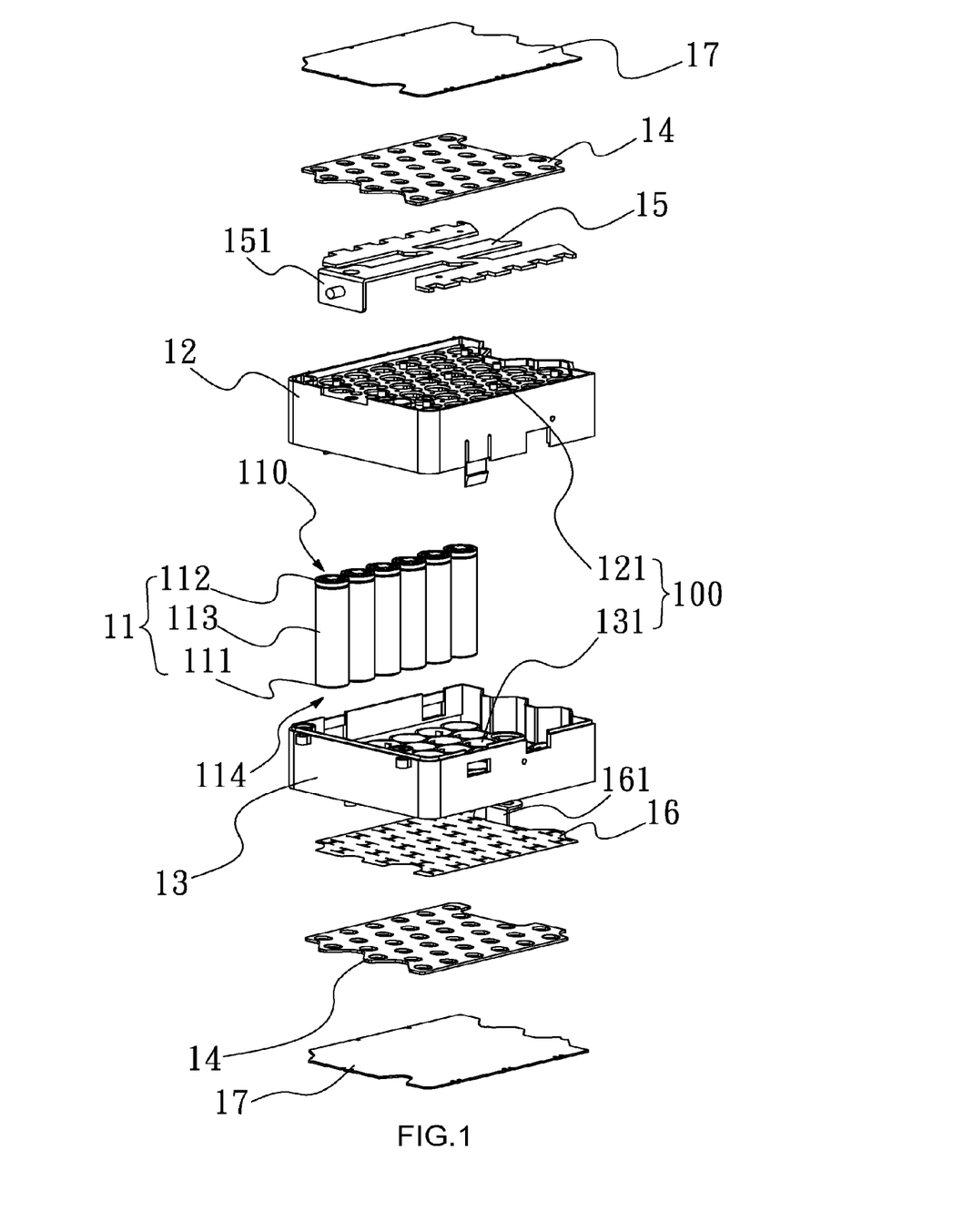
FIG. 1 is an exploded schematic view of the battery assembly with an adhesive stop mechanism according to the first preferred embodiment of the invention.
Figure 2:
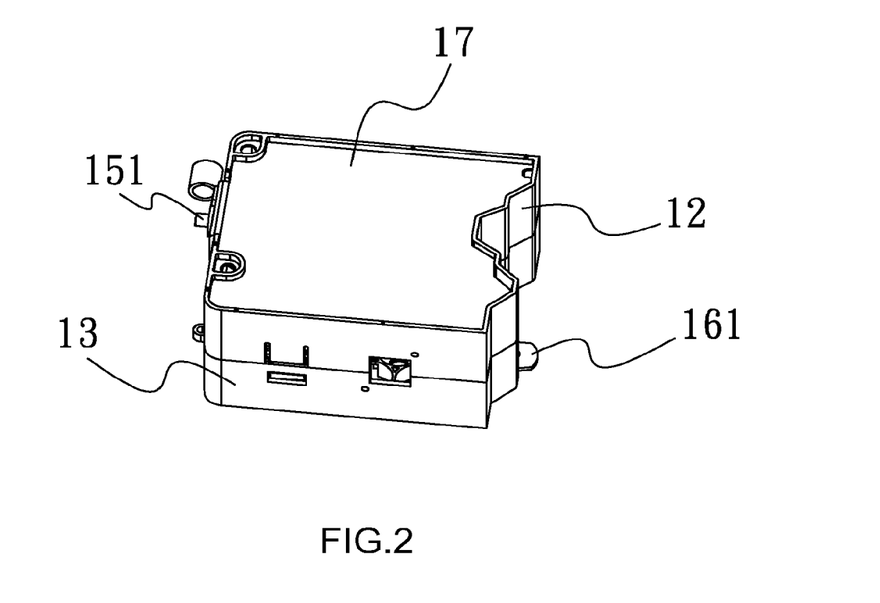
FIG. 2 is a schematic perspective view showing the assembling of the battery assembly of FIG. 1.
Figure 3:
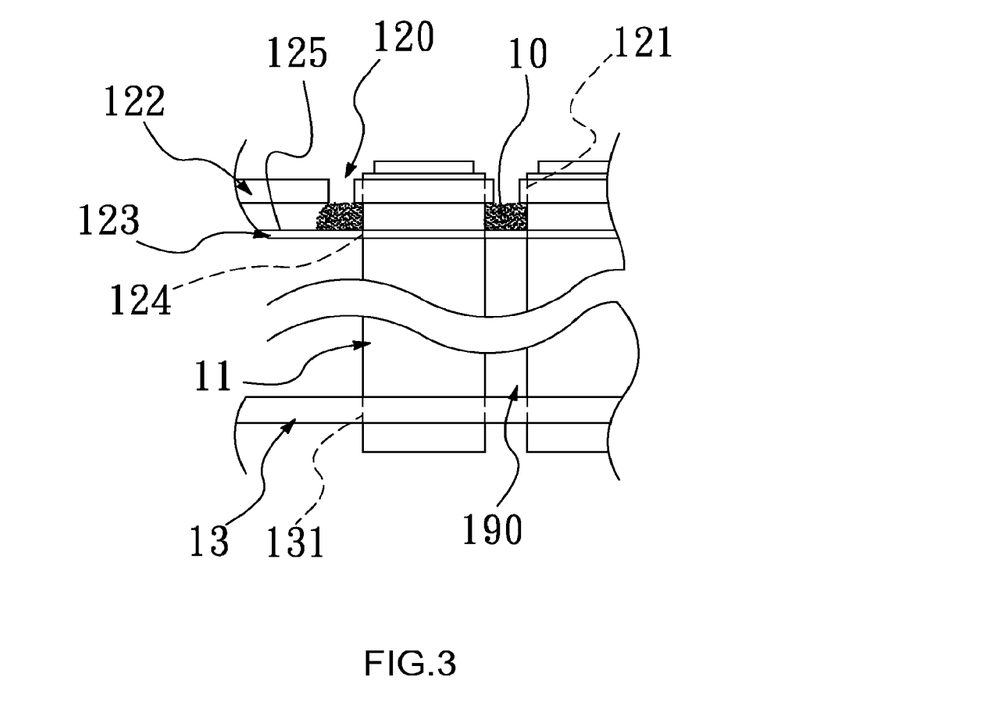
FIG. 3 is a schematic cross-sectional view of the battery assembly of FIG. 1, showing that battery cells are held by the primary retaining frame and the secondary retaining frame.

FIGS. 1, 2 and 3 show the battery assembly according to the first preferred embodiment of the invention, whose frames comprise an adhesive stop mechanism. The battery assembly comprises multiple battery cells 11, a primary retaining frame 12, a secondary retaining frame 13, a common electrode and a bonding layer 10. The common electrode is divided into a top common electrode 15 and a bottom common electrode 16. Each of the battery cells 11 has a sealed bottom portion 111, a sealed top portion 112 and a sidewall 113 connecting the bottom portion 111 to the top portion 112. The respective top portions 112 of the battery cells 11 are formed with a positive top electrode 110, while the respective bottom portions 111 are formed with a negative bottom electrode 114. According to this embodiment, the battery assembly may comprise a heat dissipation device fabricated in the form of a thermal conductive resilient pad 14 made of resilient material, such as rubber and silicone material. During the manufacture process, the resilient material is doped with carbon powder or metallic powder to impart thermal conductivity and resiliency to the pad 14.

Figure 4:
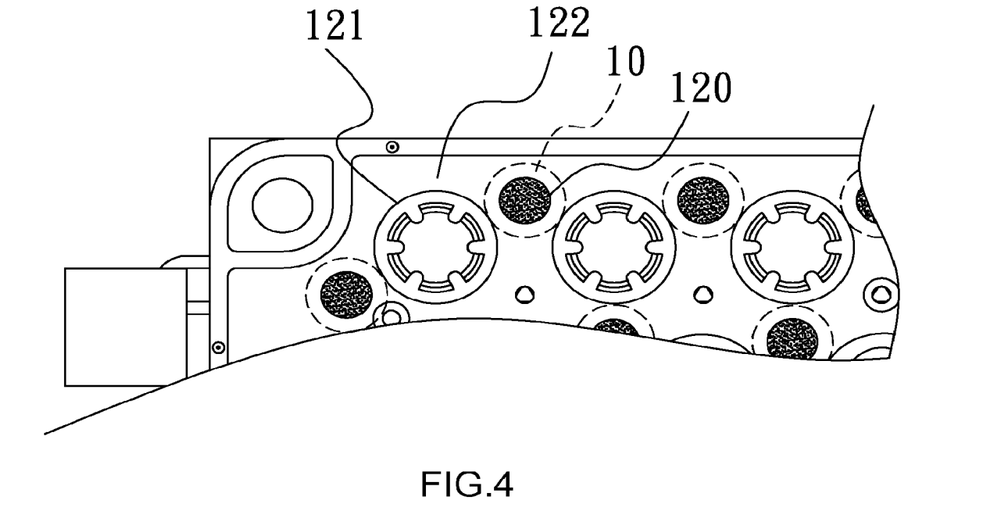
FIG. 4 is a schematic top view of the battery assembly of FIG. 1, showing that the adhesive composition is applied through the adhesive application pores formed on the primary retaining frame.

According to this embodiment, the primary retaining frame 12 and the secondary retaining frame 13 are plastic frames fabricated by plastic injection molding, as shown in FIG. 4. The primary retaining frame 12 is molded to include an outer deck 122 and a shallow deck 123. The outer deck 122 is alternately formed with retaining holes 121 and adhesive application pores 120, whereas the shallow deck 123 is correspondingly formed with an equal amount of through holes 124 to the amount of the retaining holes 121, with the respective through holes 124 being identical in size to the respective retaining holes 121. The secondary retaining frame 13 is molded to include a plurality of accommodation holes 131, each corresponding to one of the retaining holes 121. The primary retaining frame 12 is coupled to the secondary retaining frame 13 in such a manner that the respective retaining holes 121 register with the respective accommodation holes 131 corresponding thereto to constitute multiple accommodation chambers 100. Each of the accommodation chambers 100 is configured to receive a battery cell 11, so that the battery cell 11 will not easily fall off from the accommodation chamber 100 during the adhesive application process.

For the purpose of illustration, the "stop portion," as denoted by the numeral 125, refers to the portions of the shallow deck 123 that correspond to the adhesive application pores 120 formed on the outer deck 122. Since the battery cells 11 will fit in and thus generally seal the through holes 124 upon being received by the accommodation chambers 100, the shallow deck 123 is rendered liquid-tight by means of the stop portions 125 and the battery cells 11. By virtue of this arrangement, a generally sealed space is defined between the outer deck and shallow deck of the primary retaining frame 12 and communicates with the ambient through the adhesive application pores 120 only. It should be noted that the "sealed space" described herein is not an air-tight space but a space where the once-permeable retaining holes 121 and through holes 124 are generally sealed by the battery cells 11 and only the adhesive application pores 120 are left unsealed.

Afterwards, a suitable amount of viscous adhesive composition, optionally blended with thermal conductive material such as carbon powder, is applied to the sealed space through the adhesive application pores 120 formed on the outer deck 122 and confined between the outer deck 122 and the shallow deck 123, so that the viscous adhesive composition is allowed to gradually spread out between the outer deck 122 and the shallow deck 123. The adhesive composition is cured into the bonding layer 10 adhesively attached to the sidewalls 113 at a position near the respective top portions 112 of the battery cells 11. The formation of the bonding layer 10 not only firmly holds the battery cells 11 within the accommodation chamber 100, but also constitutes a heat dissipation ventilation portion 190 defined by the space between the shallow deck 123 and the secondary retaining frame 13, whereby the respective battery cells 11 held within the accommodation chamber 100 have a significantly increased surface area in thermal communication with ambient air. Moreover, since the bonding layer 10 is doped with thermal conductive material, it can facilitate heat dissipation from the battery cells 11 to the environment, in addition to securing the battery cells 11 within the accommodation chamber 100.

The respective battery cells 11 are individually welded via their positive electrodes 110 to the top common electrode 15. The top common electrode 15 includes a positive terminal 151 protruding beyond an edge of the primary retaining frame 12. Similarly, the respective battery cells 11 are individually welded to the bottom common electrode 16 via the negative electrodes 114, and the bottom common electrode 16 includes a negative terminal 161 protruding beyond an edge of the secondary retaining frame 13.

Figure 5:
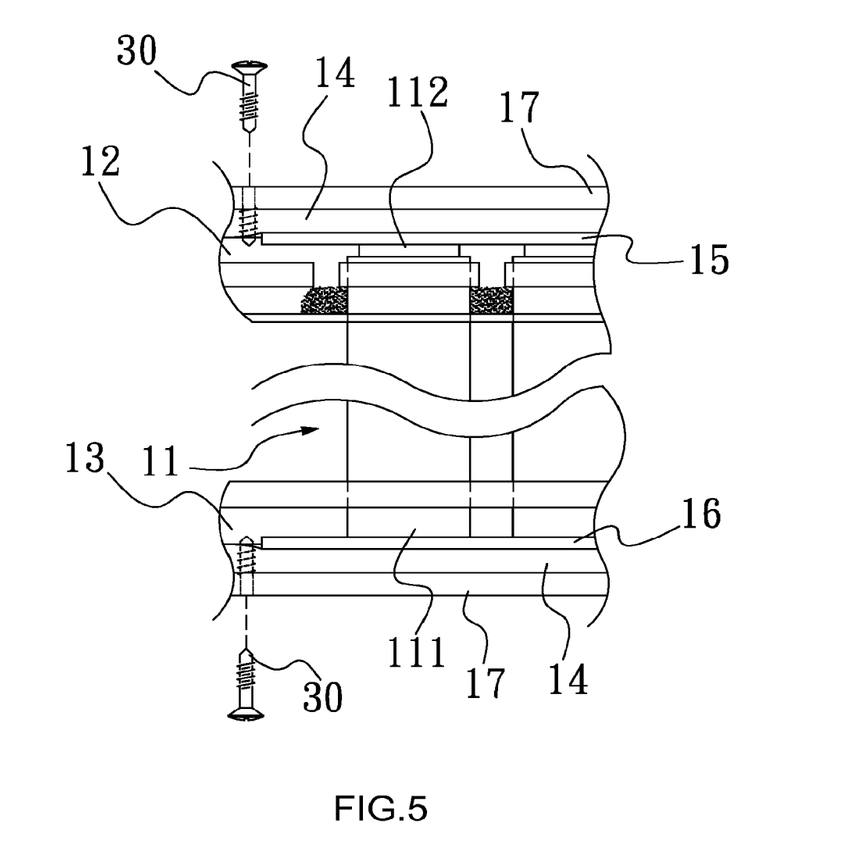
FIG. 5 is another schematic cross-sectional view of the battery assembly of FIG. 1, showing that the primary retaining frame and the secondary retaining frame are each screw-attached with a metallic sheet.

Referring to FIG. 5, upper and lower thermal conductive resilient pads 14 are pressed towards the primary retaining frame 12 and the secondary retaining frame 13 by a metallic sheet 17, respectively. The respective metallic sheets 17 are then secured to the primary retaining frame 12 and the secondary retaining frame 13 via screw bolts 30. As a result, the thermal conductive resilient pads 14 are forcedly deformed by pressurization and in turn abut against the common electrodes 15, 16 from the outside. Furthermore, since the respective thermal conductive resilient pads 14 are intimately sandwiched between the metallic sheet 17 and the top or bottom common electrode 15, 16, the heat generated by the battery cells 11 during the operation can be effectively dissipated via their top and bottom portions 111, 112 to the metallic sheets 17 and then to the ambient, in addition to via the bonding layer 10 and the heat dissipation ventilation portion 190.

While the primary retaining frame 12 is formed with the outer deck 122 and the shallow deck 123 according to the embodiment described above, the secondary retaining frame 13 may also be fabricated to include an outer deck and a shallow deck in the same manner. In this case, a suitable amount of adhesive is similarly provided between the outer deck 122 and the shallow deck 123 of the secondary retaining frame 13, so that the respective battery cells 11 are held by the two bonding layers 10 at the portions of their sidewalls 113 near the top portions 112 and the bottom portions 111 and therefore secured within the accommodation chamber 100.

Figure 6:
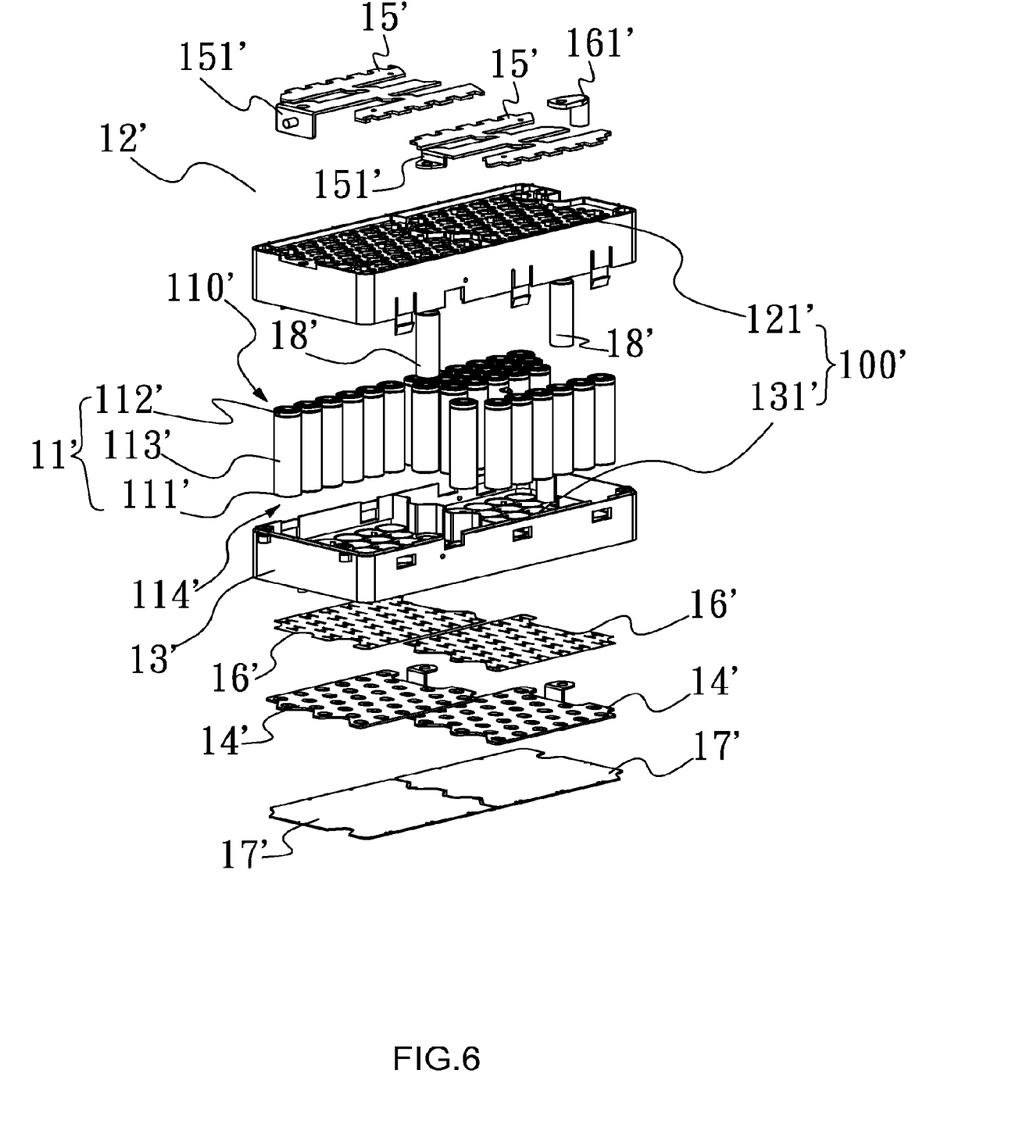
FIG. 6 is an exploded schematic view of the battery assembly with an adhesive stop mechanism according to the second preferred embodiment of the invention, showing the electrical connection of two battery assemblies.
Figure 7:
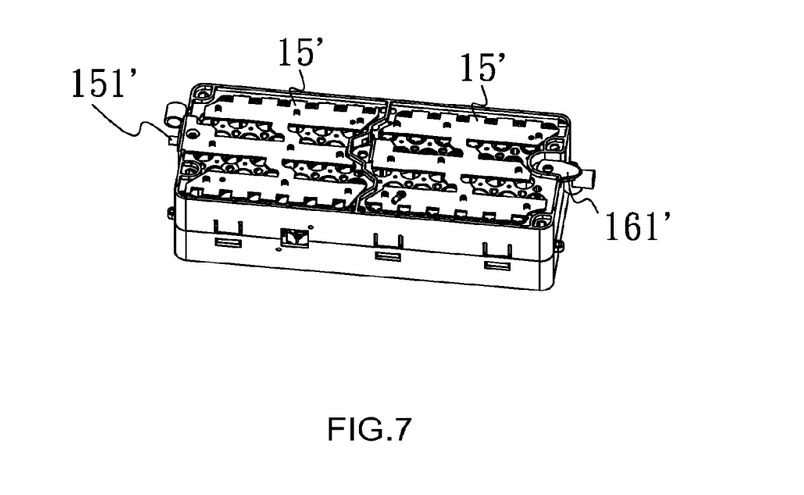
FIG. 7 is a schematic bottom view of the battery assembly of FIG. 6.

FIGS. 6 and 7 illustrate the battery assembly according to the second preferred embodiment of the invention. In this embodiment, two battery assemblies, each being provided with a conductive pillar 18', are combined together. The conductive pillar 18' has a volume substantially identical to that of a battery cell 11'. While the conductive pillar 18' is made of copper in this embodiment, other electrically conductive material, including but being not limited to aluminum, silver, stainless steel and an alloy thereof, can be employed according to the invention.

When the respective battery cells 11' are inserted into the corresponding accommodation holes 131', an accommodation hole 131' is reserved and subsequently receives a conductive pillar 18'. Next, the negative electrodes 114' of the respective battery cells 11', as well as the bottom ends of the respective conductive pillars 18', are electrically connected to the bottom common electrode 16'. A thermal conductive resilient pad 14' is then sandwiched between the secondary retaining frame 13' and a metallic sheet 17' and secured to the secondary retaining frame 13' through a screw connection of the metallic sheet 17' to the secondary retaining frame 13', so that the thermal conductive resilient pad 14' is forcedly deformed by pressurization and in turn abuts against the bottom common electrode 16' and the metallic sheet 17'. For the purpose of clarity, a single resilient pad 14' is illustrated in this embodiment. The top common electrode 15' is electrically connected to the positive electrodes 110' of the respective battery cells 11' and arranged to be electrically insulated from the conductive pillar 18'.

The bottom common electrode 16' of the battery assembly is electrically connected via the conductive pillar 18' to the positive terminal 151' of the top common electrode 15' in the neighboring battery assembly, thereby establishing a serial connection between the two battery assemblies. In the arrangement described herein, the total power output is increased by serial connection of the two battery assemblies. Meanwhile, the conductive pillar 18' of the neighboring battery assembly is provided with a conductive connector 161' and serves as a negative terminal of the assembly. While two battery assemblies are combined for the purpose of illustration in this embodiment, the assembly can be expanded by serial connection to additional battery assemblies, depending on the power output required.

It is apparent to those skilled in the art that the electric flow path described above can be rearranged to achieve a parallel connection of two neighboring battery assemblies. In this case, the top common electrodes of the two neighboring battery assemblies are electrically connected to each other and the conductive pillars are electrically connected to each other.

Figure 8:
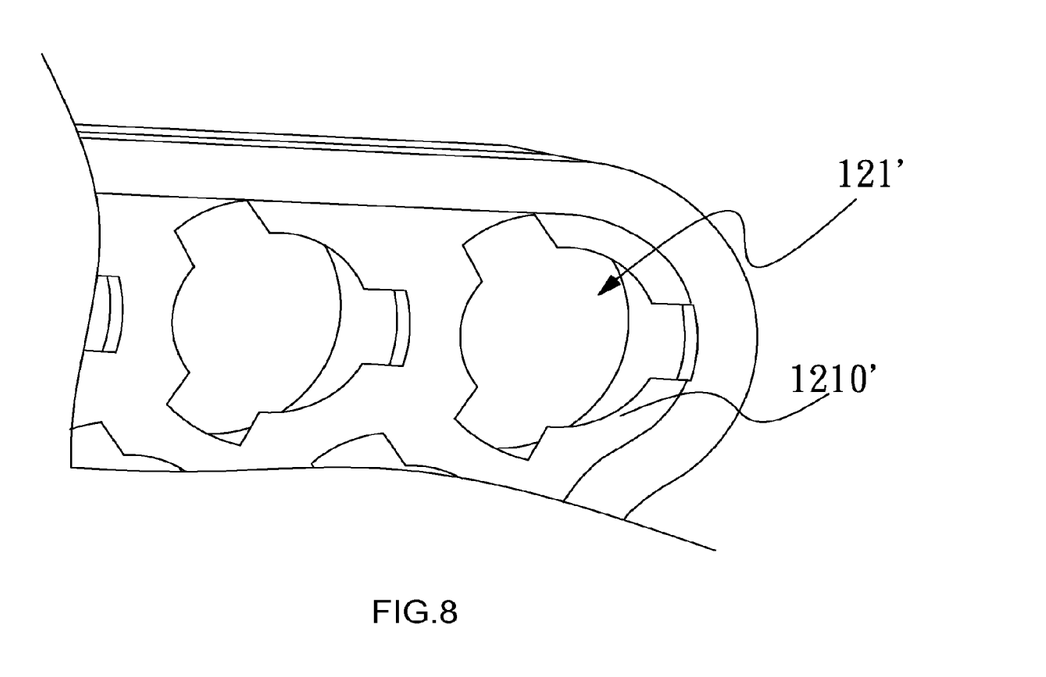
FIG. 8 is a schematic perspective diagram showing that the primary retaining frame of the battery assembly of FIG. 6 is formed with multiple interference flanges.
Figure 9:
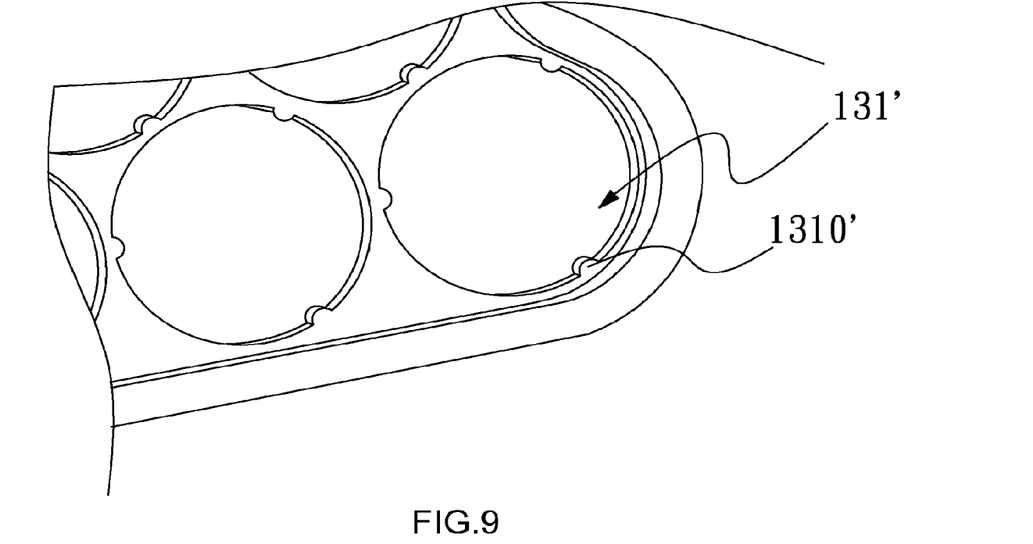
FIG. 9 is a schematic perspective diagram showing that the secondary retaining frame of the battery assembly of FIG. 6 is formed with multiple interference flanges.

Referring to FIGS. 8 and 9, the retaining holes 121' and the accommodation holes 131' are additionally and individually accompanied with three interference flanges 1210', 1310', and the interference flanges 1210', 1310' are plastic protrusions formed during the molding of the primary retaining frame 12' and the secondary retaining frame 13'. The number of the interference flanges 1210', 1310' may vary depending upon the actual need. In order to avoid scratch and damage to the battery cells 11', the interference flanges 1210', 1310' are suitably configured to extend inwardly from the peripheries of the respective retaining holes and the respective accommodation holes, so that the respective battery cells 11' are gently held by the interference flanges 1210', 1310' at the portions of their sidewalls 113' adjacent to the bottom portions 111' and the top portions 112', thereby being firmly held within the accommodation chamber 100'.

Figure 10:
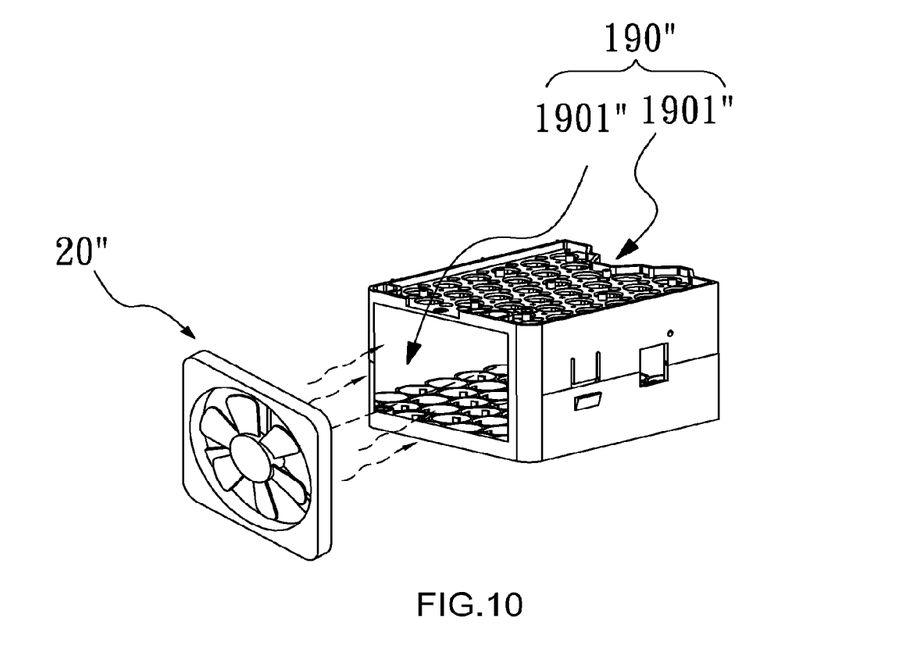
FIG. 10 is a schematic view of the battery assembly with an adhesive stop mechanism according to the third preferred embodiment of the invention, in which a cooling fan is provided for heat dissipation.

FIG. 10 shows the battery assembly according to the third preferred embodiment of the invention. In this embodiment, the heat dissipation ventilation portion 190" further comprises two air vents 1901", one of them being fitted with a cooling fan 20". Preferably, the cooling fan 20" has a surface area substantially identical to that of the air vent 1901" to which it is fitted. The cooling fan 20" is operable to deliver ambient air into the heat dissipation ventilation portion 190" and remove hot air from the heat dissipation ventilation portion 190" through the other air vent 1901", so that the heat generated by the battery cells is effectively dissipated away from the heat dissipation ventilation portion 190" by the convective air flow created by the cooling fan 20". Optionally, both of the air vents 1901" are fitted with a cooling fan 20", respectively, wherein one of the cooling fans 20" functions to deliver ambient air into the heat dissipation ventilation portion 190" and the other one withdraws hot air from the heat dissipation ventilation portion 190", so that a convective air flow is created within the heat dissipation ventilation portion 190" to improve the heat dissipation efficiency even more.

However, due to structural limitation, the ambient air that initially contacts the battery cells located near the periphery of the battery assembly has a relatively low temperature compared to the air that has flown into the central portion of the battery assembly and performed heat exchange with the battery cells located near the periphery of the battery assembly. As a result, the battery cells located in the central portion of the battery assembly exhibit poorer heat dissipation efficiency compared to those located near the periphery of the battery assembly.

Figure 11:
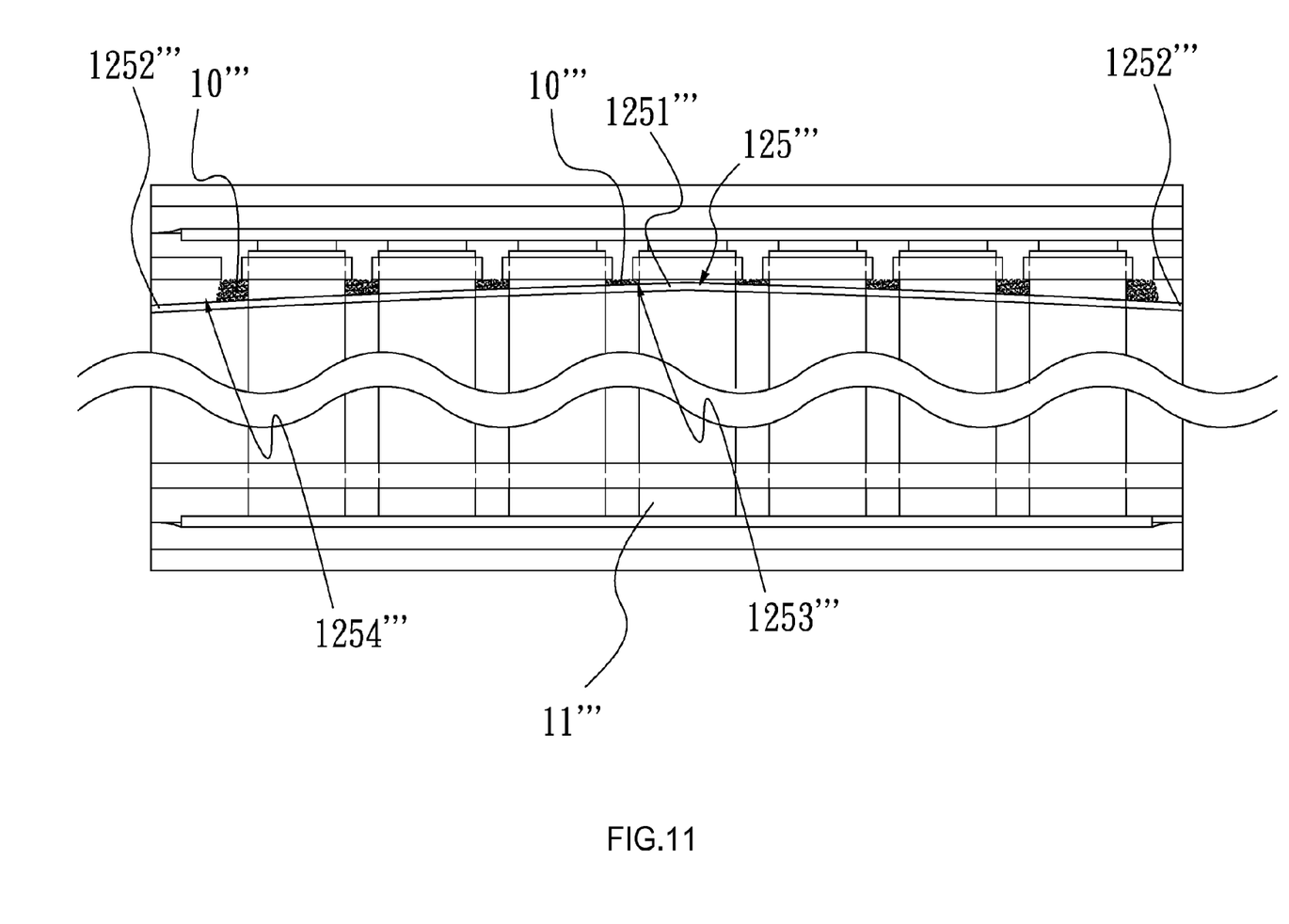
FIG. 11 is a schematic side view of the battery assembly with an adhesive stop mechanism according to the fourth preferred embodiment of the invention, in which the stop portions extend in arc form.

In order to overcome the structural limitation, the battery assembly according to the fourth preferred embodiment of the invention as shown in FIG. 11 comprises stop portions 125''' extending in arc form, each including a shallow part 1251''' and two end parts 1252'''. The shallow part 1251''' is arranged to separate from the outer deck 122''' by a short distance 1253'''. The end parts 1252''' are illustrated in this embodiment to be the portions extending away from the shallow part 1251''', each being arranged to separate from the outer deck 122''' by a long distance 1254'''. The long distance 1254''' is greater than the short distance 1253''', so that the bonding layer 10''' formed on the shallow part 1251''' differs in thickness from those formed on the end parts 1252'''.

Since the battery cells 11' located in the central portion of the battery assembly are held by the thinner bonding layers 10''' formed on the shallow parts 1251''', they have a larger surface area in contact with air compared to the battery cells located near the periphery of the battery assembly and, thus, demonstrate an improved heat dissipation efficiency. In contrast to a conventional battery assembly whose charge/discharge operation has to be slowed down or even temporarily stopped when any battery cell mounted therein has a temperature reaching a certain limit, the battery assembly disclosed herein can effectively reduce the temperature of the battery cells which may exhibit the highest temperature in the assembly and, therefore, demonstrate an enhanced operability.

Figure 12:
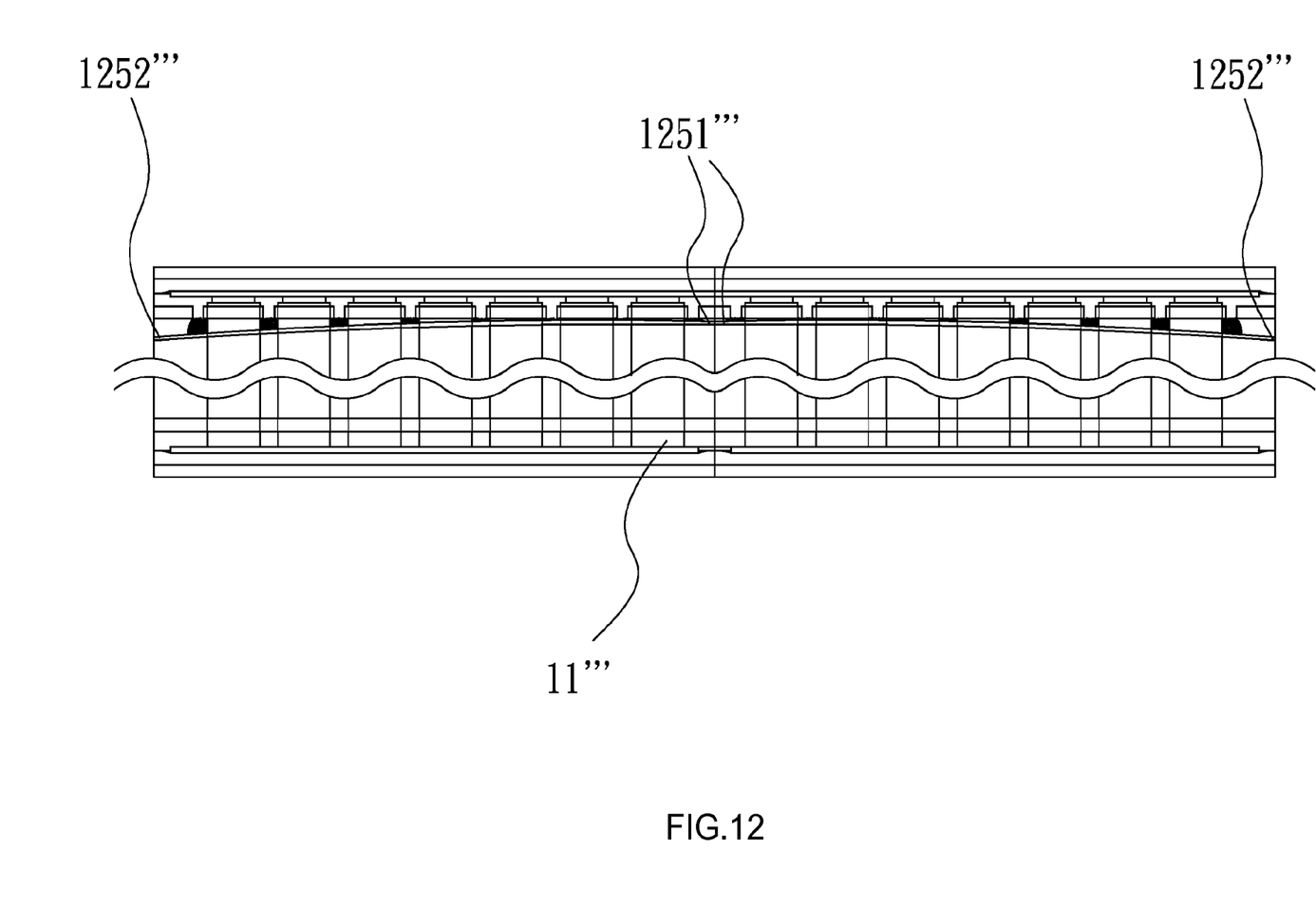
FIG. 12 is a schematic side diagram showing that two battery assemblies shown in FIG. 11 are combined together, in which the stop portions of the two battery assemblies are connected to extend in arc form.

In the case where the battery assembly disclosed herein is combined with another battery assembly, the shallow parts 1251''' are arranged to be at the position where the two battery assemblies are connected to each other, while the end parts 1252''' are located at the position opposite to the shallow parts 1251'''. Therefore, the resultant combination allows the battery cells located in the central portion to present improved heat dissipation efficiency.

The battery assembly disclosed herein comprises an adhesive stop mechanism, in which the viscous adhesive composition applied via the adhesive application pores during the adhesive application process is confined between the outer deck and the shallow deck by the stop portions. By virtue of the adhesive stop mechanism, only a small amount of the viscous adhesive composition is needed to secure the battery cells in position, while large surface areas of the battery cells are exposed to the heat dissipation ventilation portion and brought in contact with air. The heat dissipation ventilation portion may be further formed with air vents, and one or more cooling fans may be fitted to the air vents to facilitate air flow within the heat dissipation ventilation portion, thereby enhancing the heat dissipation efficiency from the sidewalls of the battery cells.

Moreover, a heat dissipation device is brought in thermal communication with the battery cells and the top common electrode and/or the bottom common electrode, so as to permit heat to rapidly dissipate from the battery cells via two ends thereof. During the injection molding of the primary and secondary retaining frames, one or more interference flanges are formed in such a manner that they extend inwardly from the peripheries of the respective retaining holes and the respective accommodation holes towards the centers of the holes. Therefore, upon being installed into the accommodation chambers, the battery cells are held in position by the interference flanges. By virtue of this arrangement, the battery cells are firmly held within the accommodation chambers and will not easily fall off from the accommodation chamber during the subsequent adhesive application process.

In light of the invention disclosed herein, the respective battery cells are firmly held within the accommodation chambers by the bonding layer cured from the applied adhesive composition. As a result, the battery cells can hardly fall off even subjected to severe vibration, thereby preventing the occurrence of short circuit and increasing safety during operation. The power source assembly disclosed herein is composed of multiple battery assemblies connected in series or in parallel with one another and the respective battery assemblies can be easily dissembled and reassembled. During maintenance, the technician can simply replace the battery assemblies that contain unworkable battery cells with functional battery assemblies. Manpower needed for maintenance works is thus reduced considerably. The invention achieves the objects described above accordingly.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A battery assembly configured to house a plurality of battery cells, the battery assembly provided with an adhesive stop mechanism, comprising:
   a primary retaining frame comprising an outer deck and a shallow deck,
   wherein the outer deck is formed with a plurality of retaining holes and a plurality of adhesive application pores, and wherein the shallow deck is formed with a plurality of through holes, each corresponding to one of the retaining holes, and a plurality of stop portions, each corresponding to one of the adhesive application pores; and
   a secondary retaining frame formed with a plurality of accommodation holes, each corresponding to one of the retaining holes, the respective retaining holes being registered with the respective accommodation holes corresponding thereto to constitute a plurality of accommodation chambers for housing the plurality of battery cells.

2. The battery assembly provided with an adhesive stop mechanism according to claim 1, further comprising a heat dissipation device coupled to the primary retaining frame and the secondary retaining frame, such that the heat dissipation device abuts against and thermally communicates with a top common electrode and a bottom common electrode.

3. The battery assembly provided with an adhesive stop mechanism according to claim 2, wherein the heat dissipation device is a resilient pad with thermal conductivity.

4. The battery assembly provided with an adhesive stop mechanism according to claim 1, wherein the primary retaining frame and the secondary retaining frame are each an integrally formed one-piece plastic member.

5. The battery assembly provided with an adhesive stop mechanism according to claim 3, further comprising:
   multiple screw bolts that secure the resilient pad, the primary retaining frame, the secondary retaining frame and the battery cells received by accommodation chambers together.

6. The battery assembly provided with an adhesive stop mechanism according to claim 2, wherein the heat dissipation ventilation device is formed with at least two air vents.

7. The battery assembly provided with an adhesive stop mechanism according to claim 6, further comprising at least one cooling fan mounted correspondingly to one of the air vents and adapted for dissipating the heat generated by the battery cells away from the heat dissipation ventilation device.

8. The battery assembly provided with an adhesive stop mechanism according to claim 1, wherein a bonding layer is doped with thermal conductive material.

9. The battery assembly provided with an adhesive stop mechanism according to claim 1, further comprising:
   at least one conductive pillar having a volume substantially identical to one of the battery cells, wherein the battery cells are in an amount less than that of accommodation chambers and the at least one conductive pillar are received by one of the accommodation chambers which is not occupied by any of the battery cells.

10. The battery assembly provided with an adhesive stop mechanism according to claim 1, wherein the primary retaining frame and the secondary retaining frame are formed with interference flanges extending towards respective retaining holes and/or respective accommodation holes, so that the interference flanges abut the sidewalls of the battery cells to secure the battery cells within the accommodation holes.

11. The battery assembly provided with an adhesive stop mechanism according to claim 1, wherein the stop portions each extends in arc form and comprises:
   a shallow part located in a middle section of the stop portion and arranged to separate from the outer deck by a first distance; and
   at least an end part extending away from the shallow part and arranged to separate from the outer deck by a second distance which is greater than the first distance.

12. The battery assembly provided with an adhesive stop mechanism according to claim 1
   wherein the plurality of battery cells each comprises a top end electrode and bottom end electrode.

13. The battery assembly provided with an adhesive stop mechanism according to claim 12, comprising:
   a top common electrode and a bottom common electrode electrically connected to the top end electrode and the bottom end electrode of the battery cells, respectively.

14. The battery assembly provided with an adhesive stop mechanism according to claim 1, comprising:
   a bonding layer adhesively attached to the battery cells and to the stop portions formed on the shallow deck, so as to constitute a heat dissipation ventilation portion between the shallow deck and the secondary retaining frame.

* * * * *